(12) United States Patent
Sasaki et al.

(10) Patent No.: US 8,102,601 B2
(45) Date of Patent: Jan. 24, 2012

(54) HEAD UP DISPLAY DEVICE FOR VEHICLE

(75) Inventors: Tatsuya Sasaki, Chiryu (JP); Hideyuki Nakane, Nishio (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 13/065,507

(22) Filed: Mar. 23, 2011

(65) Prior Publication Data

US 2011/0242666 A1   Oct. 6, 2011

(30) Foreign Application Priority Data

Mar. 30, 2010   (JP) .................................. 2010-79099

(51) Int. Cl.
   *G02B 27/14*   (2006.01)
   *G09G 5/00*   (2006.01)
(52) U.S. Cl. .......................................... 359/630; 345/7
(58) Field of Classification Search .................. 359/630, 359/632, 633, 200.7; 345/7–9; 318/685
See application file for complete search history.

(56) References Cited

U.S. PATENT DOCUMENTS

| | | | |
|---|---|---|---|
| 5,394,203 A * | 2/1995 | Murphy et al. ................ | 353/13 |
| 7,280,282 B2 * | 10/2007 | Kageyama et al. ........... | 359/632 |
| 7,333,269 B2 * | 2/2008 | Shiobara et al. .............. | 359/630 |
| 2011/0134498 A1 * | 6/2011 | Ohta et al. ................... | 359/200.7 |
| 2011/0241596 A1 * | 10/2011 | Sasaki et al. .................. | 318/685 |
| 2011/0242669 A1 * | 10/2011 | Torii ............................. | 359/633 |

FOREIGN PATENT DOCUMENTS

| | | |
|---|---|---|
| JP | 2002-36910 | 2/2002 |
| JP | 2006-62501 | 3/2006 |
| JP | 2006-65091 | 3/2006 |
| JP | 2006-65092 | 3/2006 |
| JP | 2006-69473 | 3/2006 |
| JP | 2009-132221 | 6/2009 |

* cited by examiner

*Primary Examiner* — Loha Ben
(74) *Attorney, Agent, or Firm* — Harness, Dickey & Pierce, PLC (57) ABSTRACT

A head up display device includes a display, an optical system having a reflecting mirror, a motor, and a reduction gear mechanism having gears in engagement with each other. A stopper gear is further on a preceding side than the last gear in the mechanism. The stopper gear includes a partial gear portion having teeth arranged in a region of the stopper gear in a range of less than 360 degrees in its rotational direction. Rotation of the stopper gear is stopped by engagement of both-end teeth of the partial gear portion with a stopper-adjacent gear, so a range of a rotation angle of the mirror is limited to a predetermined adjustable range, which includes a displayable range. The angle between an adjustable range lower limit and displayable range lower limit, and the angle between an adjustable range upper limit and displayable range upper limit are larger than 0 degree.

4 Claims, 5 Drawing Sheets

| | REDUCTION RATIO (GEAR RATIO) | | ROTATION ANGLE |
|---|---|---|---|
| | IDLER GEAR/ LAST GEAR | FIRST GEAR/ PINION GEAR | |
| MOTOR SHAFT | — | 9 | 915.2 |
| PRIMARY GEAR MEMBER | 32 | 11 | 257.4 |
| SECONDARY GEAR MEMBER | 23 | 9 | 123.1 |
| TERTIARY GEAR MEMBER | 25 | 10 | 44.3 |
| REFLECTING MIRROR ROTATABLE SHAFT | 31 | — | 14.3 (=Ac) |

FIG. 7

HEAD UP DISPLAY DEVICE FOR VEHICLE

CROSS REFERENCE TO RELATED APPLICATION

This application is based on and, incorporates herein by reference Japanese Patent Application No. 2010-79099 filed on Mar. 30, 2010.

BACKGROUND OF THE INVENTION

1. Field of the Invention

The present invention relates to a head up display device for a vehicle.

2. Description of Related Art

Conventionally, a head up display device (hereinafter referred to as an HUD device) for a vehicle is known. The HUD device displays a light-emitting image on a display, and projects the display image onto a projection member such as a windshield. Accordingly, the HUD device displays a virtual image of vehicle-related information. As a type of such a HUD device, a device that reflects a display image of a display on a reflecting mirror such as a concave mirror and projects the reflected image onto a projection member is disclosed in JP-A-2009-132221. As described above, an installation space occupied by the HUD device in a vehicle is made small by the use of the reflecting mirror.

In the HUD device disclosed in JP-A-2009-132221, a configuration, which transmits torque generated in a motor to the reflecting mirror through a gearing system for adjusting a rotation angle of a rotatably provided reflecting mirror in accordance with an adjustment command from the outside, is employed. As a result of such a configuration, by giving the adjustment command to the HUD device, a vehicle occupant can display a virtual image of vehicle-related information in an easily visually identifiable state.

However, in the HUD device disclosed in JP-A-2009-132221, the last gear of gears in the gearing system, which transmits the torque generated in the motor to the reflecting mirror, includes a partial gear portion having gear teeth arranged in the region in a range of less than 360 degrees in the rotational direction. In the case in which a reduction gear mechanism that amplifies and transmits the torque generated in the motor is employed for reduction of an installation space for the motor due to downsizing of the motor, the greatest torque is applied to the last gear and a gear one step therebefore. Accordingly, in such a reduction gear mechanism, when the generation of torque in accordance with the adjustment command is continued by the motor, despite a stop of rotation of the last gear as a result of the engagement of the gear one step before with a gear tooth of one end of the partial gear portion in the rotational direction, excessive torque which is more than a strength design value may be applied to these gears. Moreover, in a state in which the rotation of the last gear is stopped as a result of the engagement of the gear one step therebefore with the gear tooth of the one end of the partial gear portion in the rotational direction, if the image display does not change despite continuation of the adjustment command by the vehicle occupant, the occupant cannot determine whether the HUD device is at fault, so that decrease of his/her sense of reliability of the device may also be caused.

SUMMARY OF THE INVENTION

The present invention addresses at least one of the above disadvantages.

According to the present invention, there is provided a head up display device for a vehicle, including a display, an optical system, a motor, and a reduction gear mechanism. The display is configured to display a light-emitting image. The optical system includes a reflecting mirror, which is disposed rotatably relative to the display to reflect the image displayed by the display. The optical system is configured to project the image reflected on the mirror onto a projection member of the vehicle and to thereby display a virtual image of vehicle-related information on the projection member. The motor is configured to generate torque to adjust a rotation angle of the mirror in accordance with an adjustment command from an outside. The virtual image is displayable in a displayable range of the rotation angle of the mirror. The reduction gear mechanism includes a plurality of gears in engagement with each other and is configured to amplify the torque generated by the motor and to transmit the torque to the mirror. The plurality of gears include a last gear in a torque transmission direction from the motor to the mirror, a stopper gear, and a stopper-adjacent gear. The stopper gear is a gear located further on a preceding side than the last gear in the torque transmission direction in the reduction gear mechanism. The stopper-adjacent gear is adjacent to the stopper gear. The stopper gear includes a partial gear portion having a plurality of gear teeth arranged in a region of the stopper gear that is in a range of less than 360 degrees in a rotational direction thereof. The partial gear portion includes both-end gear teeth at both ends thereof in the rotational direction. Rotation of the stopper gear is stopped as a result of engagement of the both-end gear teeth of the partial gear portion with the stopper-adjacent gear, so that a range of the rotation angle of the mirror is limited to a predetermined adjustable range, which includes the displayable range. The rotation angle between a lower limit of the adjustable range and a lower limit of the displayable range, and the rotation angle between an upper limit of the adjustable range and an upper limit of the displayable range are larger than 0 degree.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

An embodiment of the invention will be described below with reference to the accompanying drawings.

Figure 1:
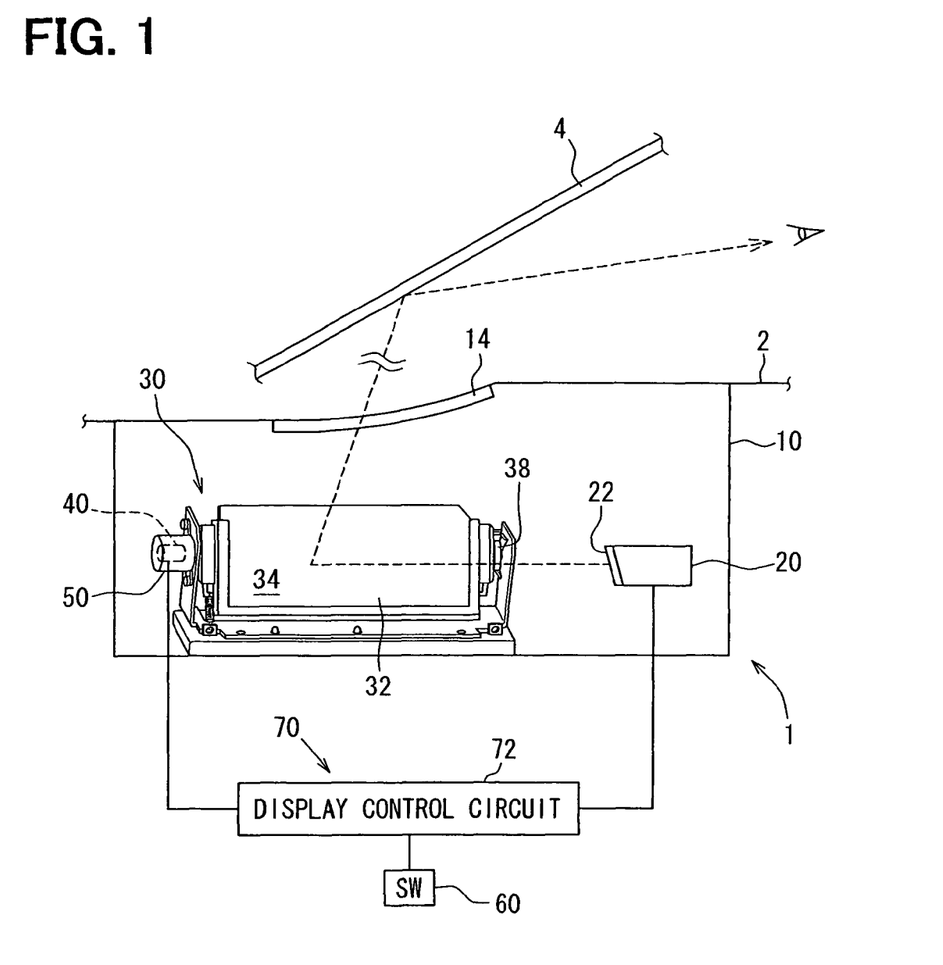
FIG. 1 is a diagram roughly illustrating configuration of an HUD device for a vehicle in accordance with an embodiment of the invention.

First, a basic configuration of an HUD device 1 for a vehicle in accordance with the embodiment will be described. The HUD device 1, which is disposed in the vehicle, includes a housing 10, a display 20, an optical system 30, a motor 40, a reduction gear mechanism 50, an adjustment switch 60, and a control system 70.

The housing 10 is formed into a hollow shape accommodating the other elements 20, 30, 40, 50 and so forth in the HUD device 1, and provided at an instrument panel 2 of the vehicle. The housing 10 includes a translucent emission window 14 at its portion that is vertically opposed to a windshield 4 serving as a projection member. The windshield 4 is fixed in front of a driver's seat of the vehicle.

Figure 2:
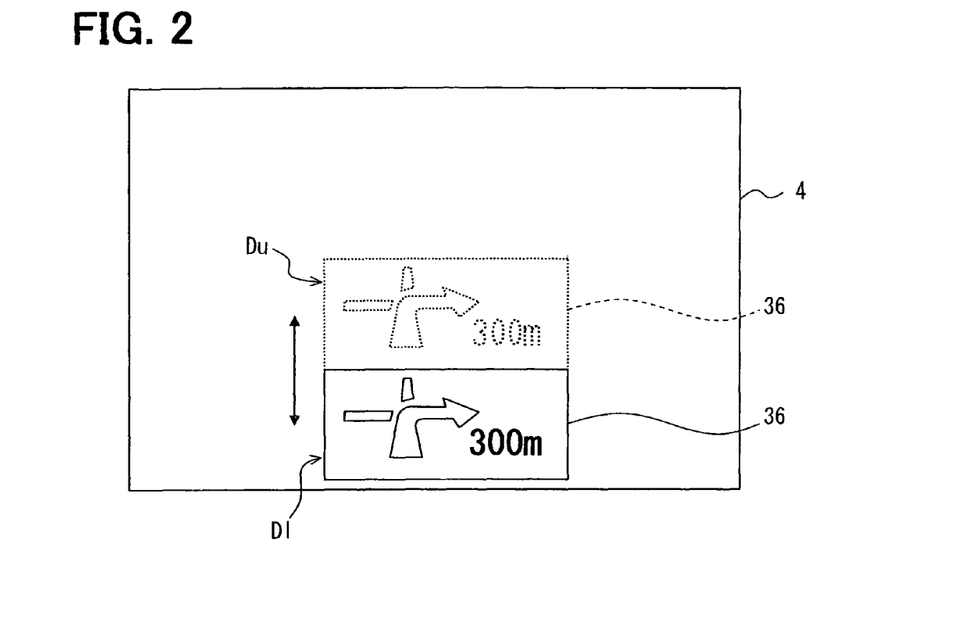
FIG. 2 is a schematic view illustrating a display state of a virtual image by the HUD device in FIG. 1.

The display 20 is, in the present embodiment, a transmitted illumination-type liquid crystal panel, and includes a screen 22 that displays an image. The screen 22 is transmissively illuminated with a built-in back light (not shown), so that the display 20 makes a display image on the screen 22 luminous. The light-emitting image displayed on the display 20 in this manner notifies vehicle-related information which is related to a vehicle operation or vehicle state. In the present embodiment, navigation information such as a vehicle traveling direction (see FIG. 2) is notified. The display image of the display 20 may be those notifying physical quantity information such as vehicle speed, remaining fuel, and coolant temperature, or vehicle exterior status information such as a traffic situation and safety situation in addition to the navigation information.

The optical system 30 is composed of optical members (those except the reflecting mirror 32 are not shown) including a reflecting mirror 32, and emits the display image of the display 20 toward the emission window 14. In the present embodiment, the reflecting mirror 32 includes a concave mirror, and includes a reflecting surface 34 concaved in a shape of a smooth curved surface. The reflecting mirror 32 enlarges the display image as an optical image, which enters directly or indirectly from the display 20 into the reflecting surface 34, and reflects the image toward the emission window 14. The reflected image on the reflecting mirror 32 is projected onto the windshield 4 through the emission window 14, so that the image is formed in the front of the shielding 4. As a result, the vehicle-related information indicated by the display image of the display 20 is displayed on the driver's seat side in the vehicle as a virtual image 36 (see FIG. 2).

Figure 3:
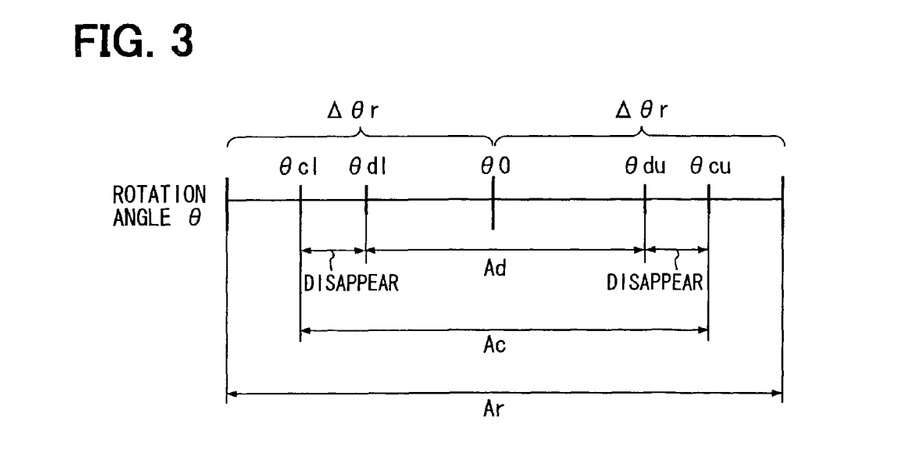
FIG. 3 is a schematic view illustrating a rotation angle of a reflecting mirror in FIG. 1.

The reflecting mirror 32 includes a rotatable shaft 38 rotatably supported by the housing 10. As a result of the rotation of the rotatable shaft 38, the reflecting mirror 32 changes the display position of the virtual image 36 illustrated in FIG. 2 in the vertical direction relative to the windshield 4. In the present embodiment, due to optical properties of the optical system 30 and the windshield 4, the display of the virtual image 36 disappears below a lower limit display position Dl of the virtual image 36 indicated by a continuous line in FIG. 2; and above an upper limit display position Du of the virtual image 36 indicated by a short dashes line in FIG. 2. Accordingly, as illustrated in FIG. 3, rotation angles θ of reflecting mirror 32 corresponding to the display positions Dl, Du of the virtual image 36 are set respectively at angles θdu, θdl. A range Ad having these angles θdu, θdl as its boundary values is set at a displayable range Ad in which the virtual image 36 can be displayed.

When the reflecting mirror 32 of the present embodiment is rotated by an angle Δθr that is larger than Ad/2 in a direction in which the display position of the virtual image 36 is changed upwards from a zero point angle θ0 of the reflecting mirror 32, which is a center point θ0 of the displayable range Ad, the reflecting mirror 32 collides with the housing 10. Accordingly, as illustrated in FIG. 3, a range Ar having an angle Δθr on both sides from the zero point angle θ0 is set as a rotatable range Ar of the reflecting, mirror 32. Nevertheless, in the present embodiment, because of a characteristic configuration of the reduction gear mechanism 50, which is described in greater detail hereinafter, rotation of the reflecting mirror 32 by the angle Δθr on both sides from the zero point angle θ0 is restricted.

Figure 4:
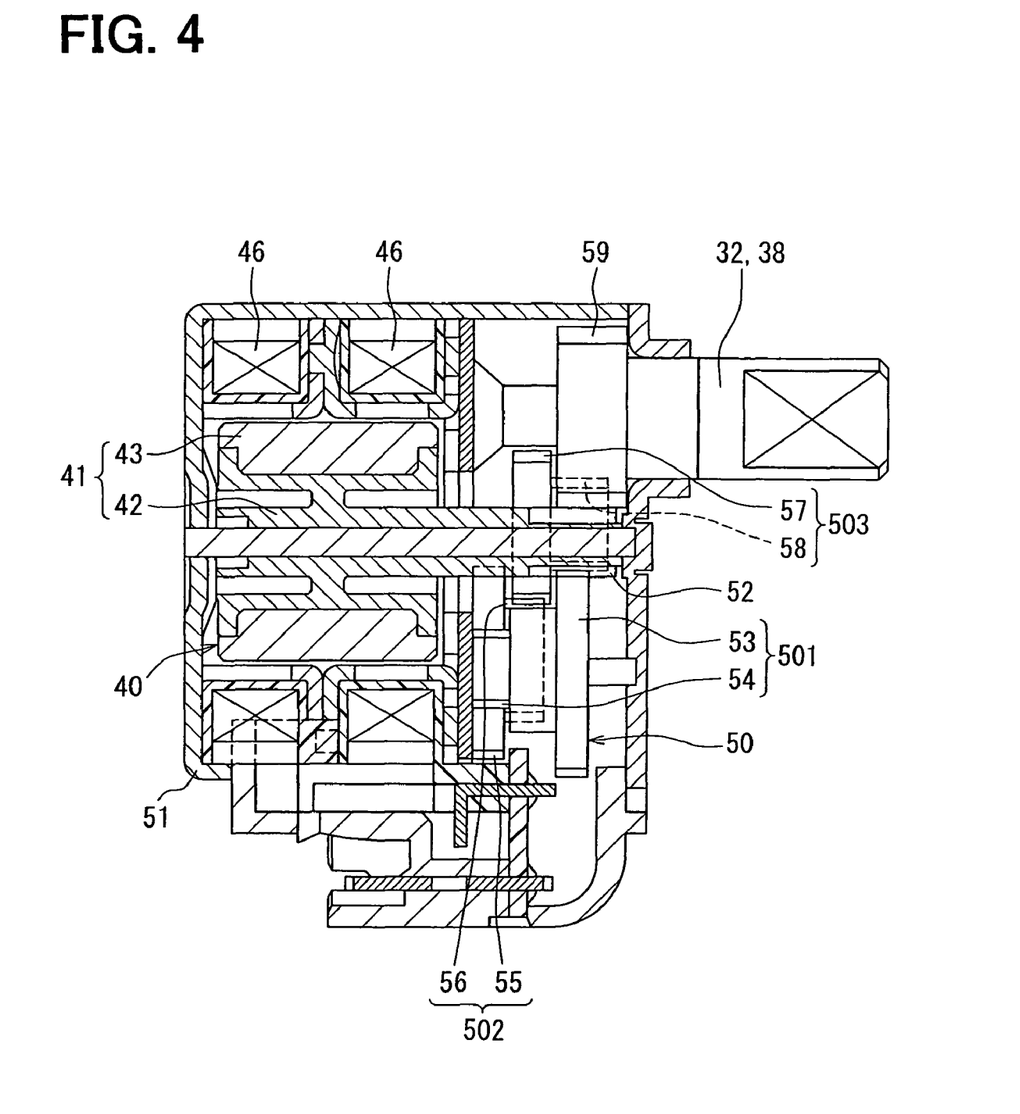
FIG. 4 is a sectional view illustrating configurations of a motor and a reduction gear mechanism in FIG. 1.

As illustrated in FIG. 4, in the present embodiment, the motor 40 is a permanent magnet-type stepping motor having a claw pole structure, and includes a rotor 41 and a stator coil 46. The rotor 41 is obtained by attaching a rotor magnet 43 to an outer peripheral side of a motor shaft 42 rotatably supported by a gear case 51, which is described in greater detail hereinafter. The stator coil 46, which is fixed to the gear, case 51, is excited upon energization of the coil 46 to rotate the rotor magnet 43. Accordingly, the stator coil 46 generates torque in the motor shaft 42.

Figure 5:
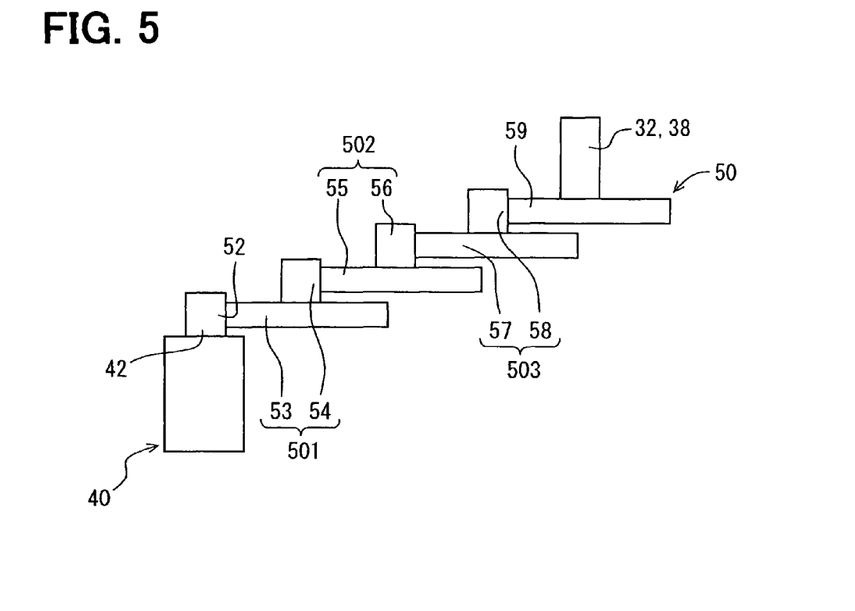
FIG. 5 is a sectional view illustrating linkage between the motor and the reduction gear mechanism in FIG. 1.

As illustrated in FIGS. 4 and 5, the reduction gear mechanism 50 is obtained by engaging gears 52 to 59 in series in the gear case 51 having a hollow shape and accommodating the motor 40. The mechanism 50 transmits the torque generated by the motor 40 to the reflecting mirror 32. The first gear 52 is provided for the motor shaft 42. The idler gear 53 and the pinion gear 54 are integrally formed as a primary gear member 501, and rotatably supported by the gear case 51. The idler gear 53, which is in engagement with the first gear 52 one step therebefore, rotates together with the pinion gear 54 one step thereafter as a result of the amplification and transmission of the torque generated by the motor 40 in accordance with a reduction ratio between these gears 52, 53:

The idler gear 55 and the pinion, gear 56 are integrally formed as a secondary gear member 502, and rotatably supported by the gear case 51. The idler gear 55, which is in engagement with the pinion gear 54 one step therebefore, rotates together with the pinion gear 56 one step thereafter, as a result of further amplification and transmission of the torque generated by the motor 40 in accordance with a reduction ratio between these gears 54, 55. The idler gear 57 and the pinion gear 58 are integrally formed as a tertiary gear member 503, and rotatably supported by the gear case 51. The idler gear 57, which is in engagement with the pinion gear 56 one step therebefore, rotates together with the pinion gear 58 one step thereafter, as a result of even further amplification and transmission of the torque generated by the motor 40 in accordance with a reduction ratio between these gears 56, 57.

Figure 6:
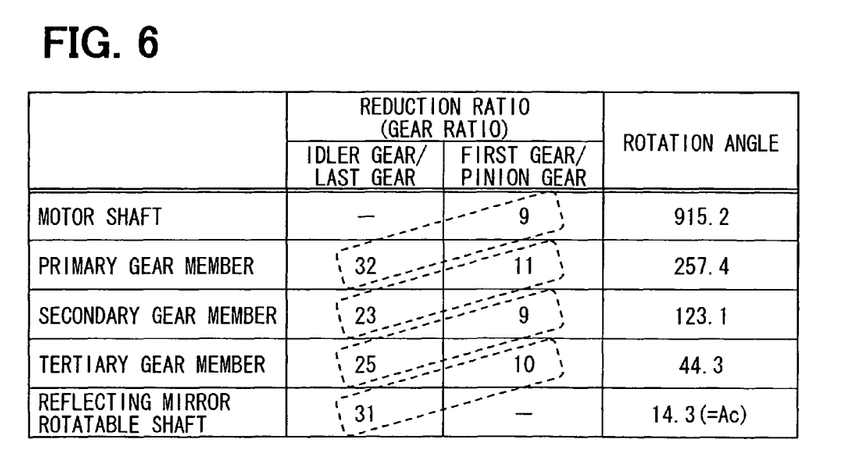
FIG. 6 is a schematic view illustrating the configuration of the reduction gear mechanism in FIG. 1.

The last gear 59 is provided for the rotatable shaft 38 of the reflecting mirror 32, and in engagement with the pinion gear 58 one step therebefore. Accordingly, the last gear 59 rotates the rotatable shaft 38 of the reflecting mirror 32 as a result of the maximum required amplification and transmission of the torque generated by the motor 40 in accordance with a reduction ratio between the last gear 59 and the pinion gear 58. When the motor shaft 42 is forward rotated, the rotatable shaft 38 is also forward rotated such that the display position of the virtual image 36 moves upwards. When the motor shaft 42 is reverse rotated, the rotatable shaft 38 is also reverse rotated such that the display position of the virtual image 36 moves downward. In the present embodiment, by setting the reduction ratio (gear ratio) among the gears 52 to 59 as circled by short dashes lines in FIG. 6, for example, rotation angles of the shafts 42, 38 and the members 501 to 503 are illustrated in FIG. 6. FIG. 6 illustrates the rotation angles when the rotation angle θ of the rotatable shaft 38 is set at 14.3 degrees corresponding to a range Ac, which is described in greater detail hereinafter.

The adjustment switch 60 illustrated in FIG. 1 is provided so that it can be operated by an occupant on a driver's seat in the vehicle. The adjustment switch 60 includes two operating members, for example, such that the occupant can selectively input an upward adjustment command for moving the display position of the virtual image 36 upward, and a downward adjustment command for moving the display position of the virtual image 36 downward. The adjustment switch 60 outputs a command signal in accordance with the adjustment command inputted through its operation.

The control system 70 includes a display control circuit 72 disposed inside or outside the housing 10. In the present embodiment, the display control circuit 72 is an electric circuit constituted mainly of a microcomputer, and connected to the electric elements 20, 40 (46), 60. The display control circuit 72 controls the image display by the display 20, and controls rotation of the motor 40 in accordance with the command signal inputted from the adjustment switch 60. In particular, in the rotation control of the motor 40, upon input of the upward adjustment command into the adjustment switch 60, the control circuit 72 forward rotates the motor shaft 42 to change the display position of the virtual image 36 upwards such that the rotation angle θ of the reflecting mirror 32 is adjusted in a forward rotational direction. On the other hand, upon input of the downward adjustment command into the adjustment switch 60, the control circuit 72 reverse rotates the motor shaft 42 to change the display position of the virtual image 36 downward such that the rotation angle θ of the reflecting mirror 32 is adjusted in a reverse rotational direction.

Figure 7:
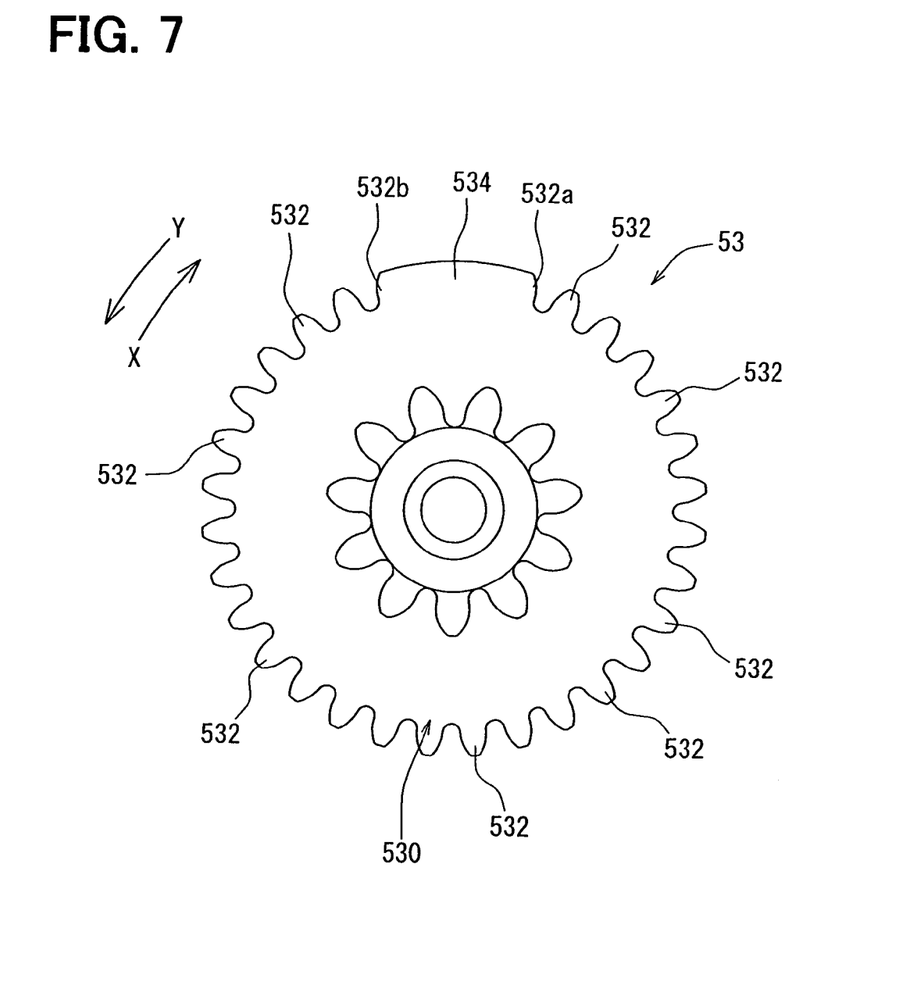
FIG. 7 is a plan view illustrating a characterizing portion of the reduction gear mechanism in FIG. 1.

Characterizing portions of the HUD device 1 for the vehicle will be described in detail below. In the reduction gear mechanism 50 illustrated in FIGS. 4 and 5, a partial gear portion 530 illustrated in FIG. 7 is provided for the idler gear 53 of the gears 52 to 58 preceding the last gear 59, which is gear-paired with the first gear 52, one step after the first gear 52, the idler gear 53 serving as a particular stopper gear. The partial gear portion 530 is formed in the region of the idler gear 53 in a range of less than 360 degrees in the rotational direction, and the gear teeth 532 are arranged in this region. A connecting portion 534 is formed in a remaining region (non-gear portion) of the idler gear 53 in which the partial gear portion 530 is not formed. The connecting portion 534 extends in a shape of a circular arc continuously from tooth top surfaces of gear teeth 532a, 532b of the partial gear portion 530 at its both ends in the rotational direction in the rotational direction of the idler gear 53. Accordingly, the connecting portion 534 connects between these gear teeth 532a, 532b.

As a result, when the idler gear 53 forward rotates in one direction X in FIG. 7 so that the one-end gear tooth 532a of the partial gear portion 530 is engaged with the first gear 52, the first gear 52 cannot engage with the connecting portion 534, and forward rotation of the idler gear 53 is thereby stopped. On the other hand, when the idler gear 53 reverse rotates in the other direction Y in FIG. 7 so that the other-end gear tooth 532b of the partial gear portion 530 is engaged with the first gear 52, the first gear 52 also cannot engage with the connecting portion 534, and reverse rotation of the idler gear 53 is thereby stopped.

As a result of such a stop of the rotation of the idler gear 53, the rotation angle θ of the reflecting mirror 32 is limited to a predetermined adjustable range Ac illustrated in FIG. 3. Particularly, the adjustable range Ac of the present embodiment is set to be broader than the displayable range Ad for the virtual image 36 as well as narrower than the rotatable range Ar for the reflecting mirror 32. Consequently, the rotation angle θ of the reflecting mirror 32 is limited to the adjustable range Ac encompassing the displayable range Ad from its both sides. The display of the virtual image 36 disappears (see FIG. 3) between these ranges Ad, Ac, and the engagement of the reflecting mirror 32 by the housing 10 is not caused outside the adjustable range Ac. In the present embodiment in which the adjustable range Ac of 14.3 degrees, for example, is employed, the most preceding gear 53 out of the gears 53 to 58 preceding the last gear 59, whose rotation angle corresponding to the range Ac is smaller than 360 degrees, includes the partial gear portion 530 as the stopper gear.

According to the HUD device 1 having the above-described characteristics, the partial gear portion 530 having the gear teeth 532 arranged in the region in a range of less than 360 degrees in the rotational direction in the reduction gear mechanism 50 is provided for the idler gear 53. Therefore, it can be assumed that the generation of torque in accordance with the adjustment command is continued by the motor 40, even though the rotation of the idler gear 53 is stopped as a result of the engagement of the gear tooth 532a or 532b of the partial gear portion 530 at its end in the rotational direction with the first gear 52, which is gear-paired with the idler gear 53. However, even if the motor 40 continues the generation of torque in spite of the rotation stop of the most preceding idler gear 53 having the minimum torque applied thereto out of those gears before the last gear 59 whose rotation angles are less than 360 degrees, the applied torque is easily limited within the range of a strength allowance. Thus, durability of the HUD device 1 can be improved.

Furthermore, in the HUD device 1, the adjustable range Ac for the reflecting mirror 32, which is limited due to the engagement of the first gear 52 with the gear teeth 532a, 532b of the partial gear portion 530 at its both ends in the rotational direction, is set at a range encompassing from its both sides the displayable range Ad, in which the display of the virtual image 36 is enabled. Accordingly, if the adjustment command that commands the angle adjustment in the forward rotational direction or reverse rotational direction under the condition in which the idler gear 53 is stopped as a result of the engagement between the gear tooth 532a or 532b and the first gear 52, is continued, the rotation angle θ of the reflecting mirror 32 is restricted outside the displayable range Ad for the virtual image 36 within the adjustable range Ac. As a result, when the vehicle occupant continues the adjustment command within the adjustable range Ac for the reflecting mirror 32, a change is produced as the disappearance of the display of the virtual image 36 before the idler gear 53 is stopped. Thus, decrease of the occupant's sense of reliability can be avoided.

Moreover, according to the HUD device 1, in the reduction gear mechanism 50 that amplifies and transmits the torque generated by the motor 40, the idler gear 53 one step after the first gear 52, which is gear-paired with the first gear 52, is smaller than the first gear 52 in terms of the rotation angle corresponding to the adjustable range Ac of the reflecting mirror 32. Hence, in the subsequent-step idler gear 53, the partial gear portion 530, which achieves the adjustable range Ac for the reflecting mirror 32 by the rotation of less than 360 degrees, is easily ensured in the region in a range of less than 360 degrees in the rotational direction. In addition, using the subsequent-step idler gear 53 which is smaller than the same gear-paired preceding-step first gear 52 in terms of the rotation angle per gear tooth, accuracy of boundary values θcl, θcu (see FIG. 3) of the adjustable range Ac can be improved.

In regard to the reduction gear mechanism 50 of the HUD device 1, after the tertiary gear member 503, the secondary gear member 502, and the primary gear member 501 are attached in this order, inside the gear case 51 that accommodates the motor 40 having the first gear 52 provided for the motor shaft 42, the last gear 59 for the rotatable shaft 38 of the reflecting mirror 32 is attached. Accordingly, the idler gear 53 formed in the primary gear member 501 is a gear that is the last in the attachment order among the gears 52 to 58 preceding the last gear 59 in the reduction gear mechanism 50. As described above, the attachment order for the idler gear 53 having the partial gear portion 530 is at the end on the preceding side of the last gear 59. As a result, reduction of working efficiency for the attachment due to a hindrance of the connecting portion 534 of the idler gear 53 to the first gear 52, which is to be in engagement with the idler gear 53, can be restrained.

In the reduction gear mechanism that amplifies the torque generated by the motor and transmits the torque to the reflecting mirror, the partial gear portion having the gear teeth arranged in the region in a range of less than 360 degrees in the rotational direction is provided for the stopper gear which is further on the preceding-step side than the last gear. In the reduction gear mechanism, even though the generation of torque in accordance with the adjustment command from the outside is continued by the motor despite the stop of rotation of the stopper gear as a result of the engagement of the one-end gear tooth of the partial gear portion in the rotational direction with another gear which is gear-paired with the stopper gear, the torque applied to these gears can be made small.

With regard to the rotation angle of the reflecting mirror, the adjustable range that is limited as a result of the stop of rotation of the stopper gear by the engagement of the gear with the gear teeth of the partial gear portion on its bath ends in the rotational direction is a predetermined angle range encompassing and sandwiching the displayable range in which the virtual image can be displayed. Therefore, in a state in which rotation of the stopper gear is stopped, if the adjustment command that commands the angle adjustment in this rotational direction is further continued, the rotation angle of the reflecting mirror is limited outside the displayable range for the virtual image within the adjustable range. Accordingly, if the vehicle occupant continues the adjustment command within the adjustable range for the reflecting mirror, a change is produced due to the disappearance of the display of the virtual image prior to stop of rotation of the stopper gear. Thus, decrease of the occupant's sense of reliability can be avoided.

For these reasons, durability of the gears constituting the reduction gear mechanism and reliability given to the vehicle occupant can be improved at the same time.

The stopper gear is the most preceding-step gear among those gears whose rotation angles corresponding to the adjustable range for the reflecting mirror are less than 360 degrees in the reduction gear mechanism. As described above, among the gears that can realize the adjustable range by the rotation of less than 360 degrees, the minimum torque is applied to the most preceding-step gear whose rotation angle corresponding to the adjustable range of the reflecting mirror is smaller than 360 degrees in the reduction gear mechanism. Accordingly, even if the generation of torque is continued by the motor in spite of the rotation stop of the most preceding-step gear as a stopper gear, as a result of the engagement of the one-end gear tooth of the partial gear portion in the rotational direction with another gear, durability can be improved by limiting the torque applied within the range of a strength allowance.

Modifications of the above embodiment will be described. The embodiment of the invention has been described so far. Nevertheless, the invention is not interpreted exclusively within the above embodiment, and it may be applied to various embodiments without departing from the scope of the invention.

Specifically, the number of gears that constitute the reduction gear mechanism 50 and the reduction ratio (gear ratio) between the gears may be those other than the number and ratio illustrated in the above embodiment. As long as it is a gear (gears 53 to 58 in the above embodiment) which is on the preceding side of the last gear (gear 59 in the above embodiment) and whose rotation angle corresponding to the adjustable range Ac is less than 360 degrees, any gear may be employed for the stopper gear in the reduction gear mechanism 50, for which the partial gear portion 530 is provided. Further, order other than those illustrated in the above embodiment may be used for the attachment order of the gears 52 to 59 constituting the reduction gear mechanism 50.

In addition, as long as it is a motor that can perform rotation control with accuracy required for the adjustment of the rotation angle of the reflecting mirror 32, a hybrid-type stepping motor, for example, may be adopted for the motor 40, other than the permanent magnet-type stepping motor of the above embodiment. Other than the liquid crystal panel of the above embodiment, those which display the light-emitting image by means of an electro-luminescence (EL) panel or an indicator, for example may be used for the display 20. Lastly, for the projection member, which projects the reflected image on the reflecting mirror, for example, a combiner provided exclusively for the HUD device 1 may be adopted instead of the windshield 4 fixed to the vehicle as in the above embodiment.

Additional advantages and modifications will readily occur to those skilled in the art. The invention in its broader terms is therefore not limited to the specific details, representative apparatus, and illustrative examples shown and described.

What is claimed is:

1. A head up display device for a vehicle, comprising:
   a display configured to display a light-emitting image;
   an optical system that includes a reflecting mirror, which is disposed rotatably relative to the display to reflect the image displayed by the display, and that is configured to project the image reflected on the mirror onto a projection member of the vehicle and to thereby display a virtual image of vehicle-related information on the projection member;
   a motor configured to generate torque to adjust a rotation angle of the mirror in accordance with an adjustment command from an outside, wherein the virtual image is displayable in a displayable range of the rotation angle of the mirror; and
   a reduction gear mechanism that includes a plurality of gears in engagement with each other and that is configured to amplify the torque generated by the motor and to transmit the torque to the mirror, wherein:
   the plurality of gears include:
      a last gear in a torque transmission direction from the motor to the mirror;
      a stopper gear which is a gear located further on a preceding side than the last gear in the torque transmission direction in the reduction gear mechanism; and
      a stopper-adjacent gear that is adjacent to the stopper gear;
   the stopper gear includes a partial gear portion having a plurality of gear teeth arranged in a region of the stopper gear that is in a range of less than 360 degrees in a rotational direction thereof;
   the partial gear portion includes both-end gear teeth at both ends thereof in the rotational direction;
   rotation of the stopper gear is stopped as a result of engagement of the both-end gear teeth of the partial gear portion with the stopper-adjacent gear, so that a range of the rotation angle of the mirror is limited to a predetermined adjustable range, which includes the displayable range; and the rotation angle between a lower limit of the adjustable range and a lower limit of the displayable range, and the rotation angle between an upper limit of the adjustable range and an upper limit of the displayable range are larger than 0 degree.

2. The head up display device according to claim 1, wherein:

the plurality of gears include intermediate gears, whose rotation angles corresponding to the adjustable range of the mirror are smaller than 360 degrees, in the reduction gear mechanism; and the stopper gear is the most preceding gear in the torque transmission direction among the intermediate gears.

3. The head up display device according to claim 1, wherein the stopper gear is a gear located further on a subsequent side in the torque transmission direction among adjacent gears in the reduction gear mechanism.

4. The head up display device according to claim 1, wherein the stopper gear is a gear that is the last in order of attachment of the reduction gear mechanism among gears of the plurality of gears, which are located further on the preceding side than the last gear in the torque transmission direction in the reduction gear mechanism.

* * * * *